United States Patent [19]

Ford et al.

[11] 4,034,458

[45] July 12, 1977

[54] BEARING EXTRACTING TOOL

[75] Inventors: William R. Ford; Everett R. Hall, both of Red Bluff, Calif.

[73] Assignee: Diamond International Corporation, New York, N.Y.

[21] Appl. No.: 687,999

[22] Filed: May 19, 1976

[51] Int. Cl.$^2$ .......... B23P 19/04

[52] U.S. Cl. .......... 29/259

[58] Field of Search .......... 29/259, 260, 258

[56] References Cited

U.S. PATENT DOCUMENTS

| | | | |
|---|---|---|---|
| 1,434,852 | 11/1922 | Sonnenburg | 29/259 |
| 1,670,573 | 5/1928 | Howell | 29/259 |
| 3,551,988 | 1/1971 | Berbel et al. | 29/259 |

FOREIGN PATENT DOCUMENTS

| | | | |
|---|---|---|---|
| 1,078,959 | 3/1960 | Germany | 29/259 |

*Primary Examiner*—James L. Jones, Jr.
*Attorney, Agent, or Firm*—Karl W. Flocks

[57] ABSTRACT

A bearing extracting tool comprising a reaction housing adapted to be placed against machinery wall structure around the end of a shaft and bearing assembly to exract the bearing assembly; an end plate on the end of the housing away fom the bearing assembly; a plurality of lifter bars with lifter elements on one end thereof and abutment members adjustably secured thereto; a lifter plate generally parallel to the end plate and disposed externally of the reaction housing; and a force applying driver member. The lifter bars extend through the reaction housing, reaction housing end plate and the lifter plate with the abutmemt members secured to the lifter bars beyond the lifter plate, but in abutment therewith. The force applying driver member extends through the lifter plate with one end applied to the reaction housing end plate and a free end accesible to a driving force tending to urge the lifter plate, the abutment members and lifter bars away from the reaction housing whereby a bearing assembly may be extracted from machinery in which it is disposed.

7 Claims, 9 Drawing Figures

BEARING EXTRACTING TOOL

BACKGROUND OF THE INVENTION

1. Field of the Invention

The present invention relates to an apparatus or tool for disassembling machinery elements for repairs and/or replacement and in particular to an apparatus for removing a bearing assembly from around the end of a shaft and from the surrounding supporting portion of the machinery housing.

2. Description of the Prior Art

Prior art apparatuses most closely exemplifying the state of the art of the subject matter of the present invention are believed to include United States patents of Howell, U.S. Pat. No. 1,670,573 and Kuffner, U.S. Pat. No. 3,605,242. Howell and Kuffner both are considered to be relevant prior art in that they disclose bearing pulling devices comprising a plurality of pulling bars with pulling lugs or protuberances on ends that are inserted between the bearing races, a jack screw for applying a lifting force to a cross member operatively connected to the pulling bars.

While prior devices may work well for the specific intended purpose thereof, actual use through experience reveals problems or disadvantages not heretofore considered. In this connection, it is noted that the jack screws of both Howell and Kuffner are positioned with one end applied against the shaft from which the bearing assembly is to be removed. Where the shaft has a small diameter or is not sufficiently sturdy, damage could be inflicted to the shaft by such bearing pulling apparatus.

SUMMARY OF THE INVENTION

The present invention comprises a new and improved apparatus or tool for disassembling machinery elements, in particular for extracting a bearing assembly.

One object of the present invention is to provide a new and improved apparatus for extracting a bearing assembly including inner and outer race members thereof from around the end of a shaft and the surrounding machinery housing wall or support portions.

Another object of the present invention is to provide an extractor apparatus whereby no force or reaction is directed against the end of the shaft from which bearing elements are to be removed.

Still another object of the present invention is to provide an improved bearing assembly removing apparatus whereby the force for removing the bearing assembly is distributed over a wide area rather than concentrated on the end of the shaft which could be bent where the shaft is relatively small or weak.

With the foregoing objects in mind, applicants have developed a new and improved apparatus for extracting a bearing assembly including inner and outer race members from around the end of the shaft and surrounding support structure or machinery housing.

BRIEF DESCRIPTION OF THE DRAWINGS

Briefly referring to the accompanying drawings, the reader will readily see that the present invention is embodied in the following figures wherein.

DETAILED DESCRIPTION OF THE INVENTION

Figure 1:
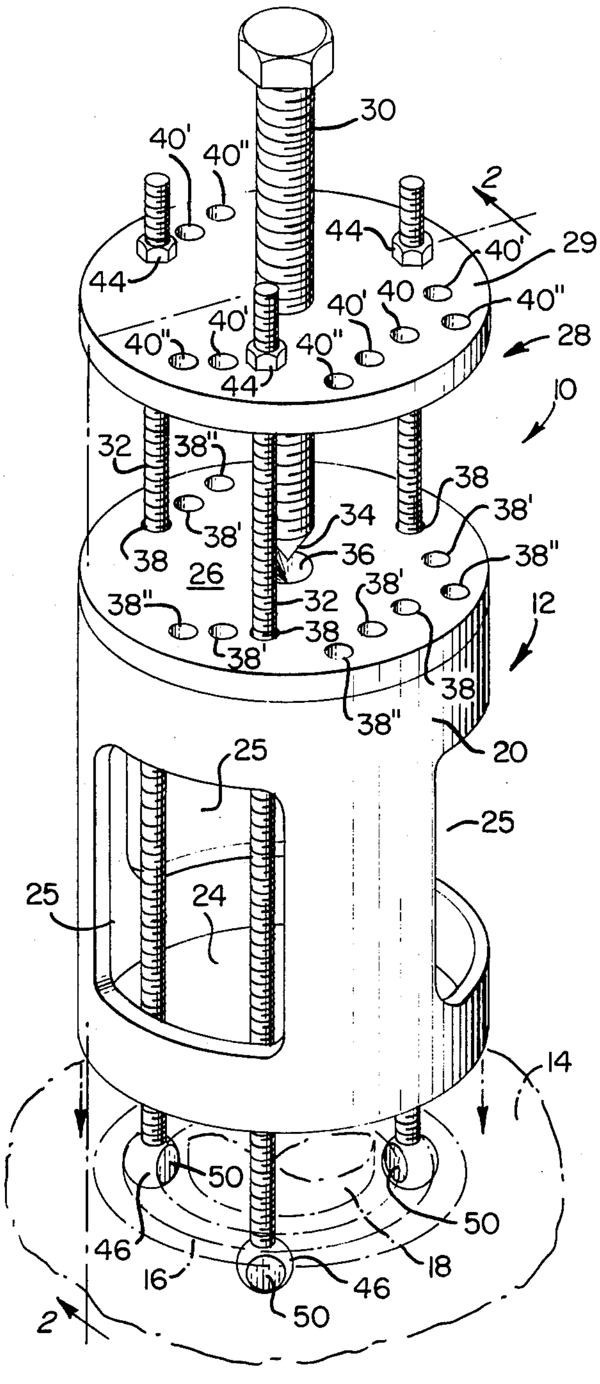
FIG. 1 represents a view in perspective of the invention applied to machinery outlined in phantom lines.
Figure 2:
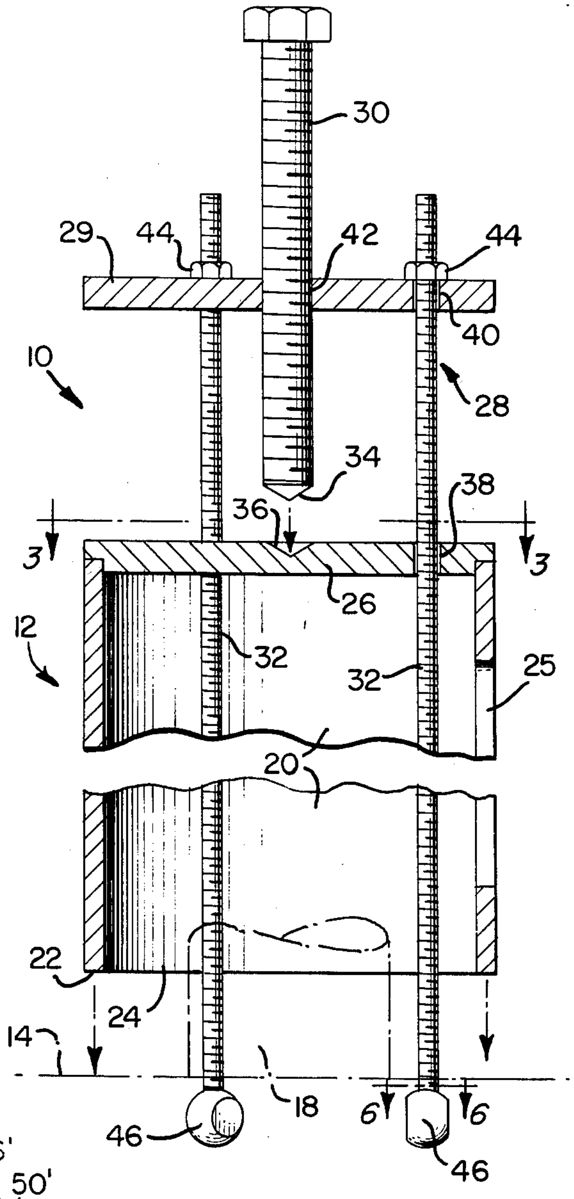
FIG. 2 is a view taken along section 2—2 of FIG. 1, looking in the direction of the arrows.

Referring now to the drawings with greater specificity and in particular to FIGS. 1 and 2, the reader will readily appreciate that the present invention is an apparatus or tool 10 for extracting a bearing assembly 16 including, for example, an inner race 15 and an outer race 17, as illustrated in phantom in FIG. 1. Bearing extracting tool 10 comprises a reaction member in the form of housing 12, which for convenience in an open bottom, hollow tubular shell 20. Shell 20 includes a lower edge 22 which defines open end 24. Windows 25 are provided in the side of shell 20. Extracting tool 10 also comprises force receiving means at the free or upper end of shell 20 in the form of a first plate 26 lifter means 28 including a second plate 29, a jack screw or force applying bolt 30, and a plurality of lifter rods or bars 32. First plate 26 is seen in FIG. 2 to be firmly seated over the upper end of shell 20 and may be optionally removable or secured thereat. Jack screw or force applying bolt 30 is formed with a pilot end 34 which in operation is seated in pressing relationship in countersunk pilot seat portion 36 formed on the upper side of first plate 26.

Figure 6A:
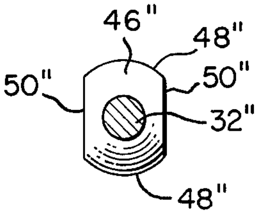
FIG. 6A is a view similar to FIG. 6 but showing an alternative construction of the lifter rod and its lifting end.
Figure 6:
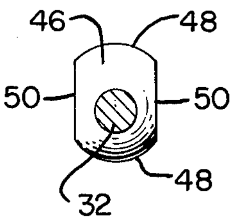
FIG. 6 is a view on an enlarged scale taken along section 6—6 in FIG. 2, looking in the direction of the arrows.

Plates 26 and 29 formed with a plurality of sets of aligned perforations 38, 38', 38'' and 40, 40', 40'', respectively, through which a lifter bar 32 may extend. As may be seen in FIG. 1, the perforations 38 and 40 are formed for convenience at about the same radial distance from the centers of plates 26 and 29, respectively, and perforations 38' and 40' and perforations 38'' and 40'' formed at progressively greater radial distances from the centers of plates 26 and 29 respectively. Second plate 29 includes a threaded bore 42 in which bolt 30 is threadedly received. Lifter rods 32 are threadedly secured to nuts 44 supported on the upper side of second plate 29. Nuts 44 may be optionally permanently secured to plate 29 or may be merely loosely supported on the upper side of plate 29. Lifter rods or bars 32 are also provided with an enlarged lifting end 46 including a partically spherical surface 48 and opposed parallel flat surfaces 50 which are formed in place of portions removed or omitted from the sphere that otherwise are continuous along spherical surface 48. As may be seen in FIG. 6, lifting end 46 is formed or provided in offset or eccentric relationship on the end of lifter bar 32. Alternatively, as illustrated in FIG. 6A, instead of the construction of lifter rod 32, a lifter rod 32'' may be provided with an enlarged lifting end 46'' without offset, but in centered relationship with the axis of lifter rod 32'' so that lifter rod 32'' extends from end 46'' centrally between parallel flat surfaces 50'',50'' and between opposite sides of spherical surface 48''.

Figure 7:
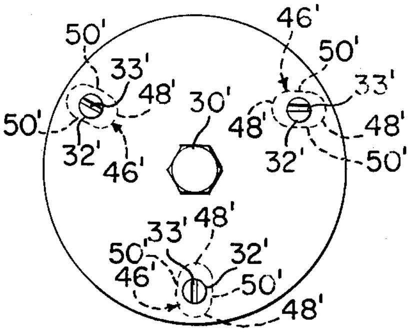
FIG. 7 shows a top plan view of the lifter means according to the present invention with alternative form of lifter rod.
Figure 3:
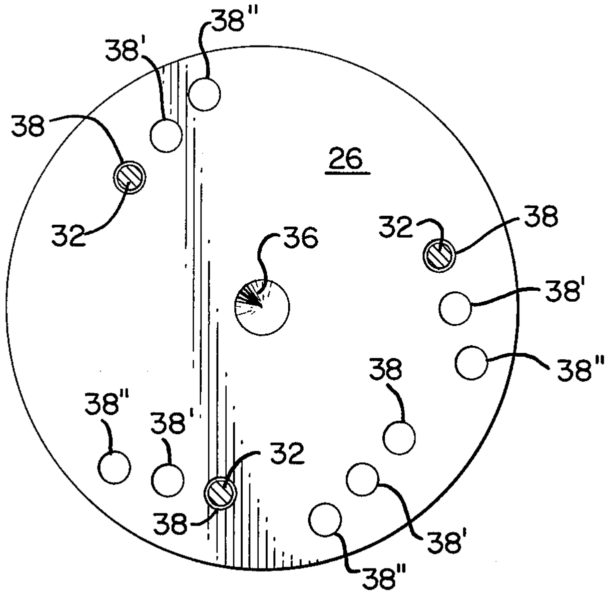
FIG. 3 is a view taken along section 3—3 in FIG. 2, looking in the direction of the arrows.
Figure 8:
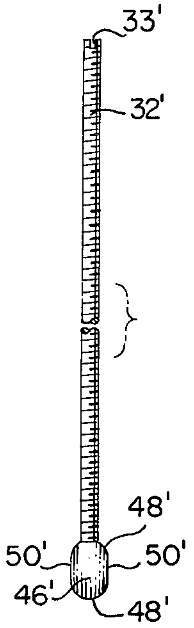
FIG. 8 shows an elevational view of one of the lifter rods in FIG. 7.

In another alternate embodiment of the disclosed invention, a lifter rod 32' is illustrated in FIG. 8 with an arrangement of a plurality of such rods 32' appearing in FIG. 7. Rod 32' is provided with an enlarged lifting end 46' at the lower end thereof which is formed with a partial spherical surface 48' extending around end 46' and parallel flat surfaces 50',50' extending in generally vertical planes where portions have been omitted from the sphere which would otherwise extend continuously around from spherical surface 48'. At the upper end of rod 32' a slot 33' is provided which slot 33' extends parallel to the flat surfaces 50',50' of lifting end 46'.

METHOD OF OPERATION

Figure 4:
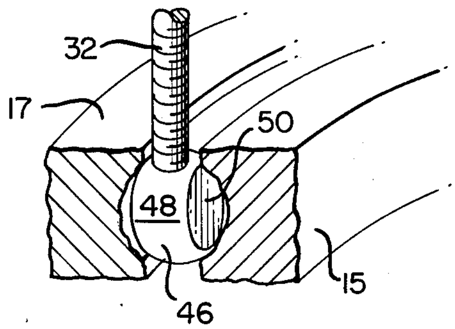
FIG. 4 is an enlarged fragmentary view in perspective showing details of a pulling element inserted into position between race members, but prior to being put into pulling condition.
Figure 5:
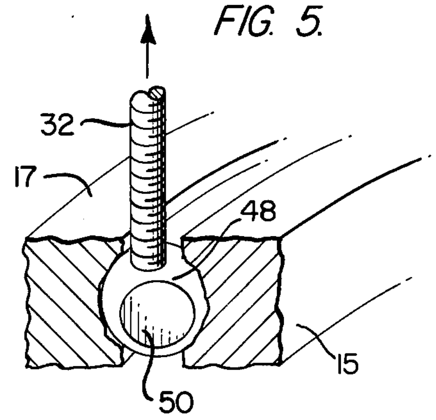
FIG. 5 is a view similar to FIG. 4 with the pulling element put into pulling condition.

With a clear understanding of the various parts making up extractor tool 10 described above, it will now be understood that lifter bars 32 may be inserted into selected aligned perforations 38, 40 or 38', 40' or 38'' or 40'' of plates 26, 29, respectively, depending upon the size of the bearing assembly 16 that is to be extracted. To use extractor tool 10, one should first cut and pry out ball retainer normally provided in bearing assembly 16, after which the ball bearing elements will roll together and leave sufficient space for insertion of lifter ends 46 of lifter bars 32. Lifter ends 46 are inserted with flat surfaces 50 along the adjacent edges of inner race 15 and outer race 17 of bearing assembly 14 as may be seen in FIG. 4 prior to being adjusted to lifting condition. Lifter ends 46 may be adjusted to lifting condition simply by rotating lifter bars 32 ninety degrees or a quarter of a turn so that the spherical surfaces 48 will contact the arcuate groove portions of race members 15 and 17. Each bar 32 is inserted at circumferential location to facilitate cooperation with plates 26 and 29. Tool 10 is further brought into operative condition by placing lower open end 24 of shell 20 around the lifter bars 32 which are then passed through perforations 38, for example, as seen in FIG. 2, are slightly larger than the diameter of bars 32 to facilitate free passage therethrough. Lower edge 22 is then lowered on machinery wall 12 and around bearing assembly 16 and shaft 18. Plate 29 which has force applying bolt 30 threaded in bore 42 is lowered over plate 26 so that bars passing through perforations 38 will then pass through an aligned perforation 40 in plate 29. Nuts 44 are then threaded onto bars 32. For optimum effectiveness, nuts 44 are adjusted so that they will allow plate 29 to be in supporting relationship thereunder in a plane parallel to plate 26 so that turning of jack screw or force applying bolt 30 effect equally distributed lifting force at the underside of each nut 44 and/or to each lifter bar 32.

With bearing extractor tool assembled as described, it will then be understood that as jack screw 30 is turned in a direction to move it downwardly through plate 29, pilot end 34 will seat in pilot seat portion 34 which will prevent further downward movement of screw 30 after which further turning in the direction to cause downward movement of screw 30 will then effect lifting of nuts 44 and lifter bars 32 which will then pull upwardly and outwardly at the enlarged lifting ends 46 with the spherical surfaces 48 thereof pulling outwardly against upper arcuate surfaces of grooves in inner and outer race members 15, 17.

With lower edge 22 of shell 20 placed against machinery wall 14, it is seen that a reaction area is effected thereat as a result of pushing of screw 30 against plate 26 and pulling thereof against nuts 44. Because lower edge 22 of shell extends over a relatively wide area, the reaction force will be distributed to provide a more stable pulling system and minimize buckling. Moreover, with the disclosed tool, no damage would normally be inflicted on shaft 18.

Additional advantages of the present invention are derived from the presence of windows 25 which provide both visual access to observe proper operation and physical access to facilitate manual adjustments such as insertion of bars 32 through selected perforations in plate 26 and degree of rotation of bars 32 to effect lifting condition.

While pilot end 34 is illustrated as being pointed, it may be within the contemplation of this invention that it be flat or rounded. It is also within the contemplation of this invention that nuts 44 may be secured to plate 26 or that they be replaced by threading perforations 40, 40',40'' which will then effect lifting of bars 32 by the respective threads thereof.

Where a larger bearing assembly than 16 is to be extracted, bars 32 would according to the teaching of the present invention be inserted through perforations 38' or 38'' and 40' or 40'' as the case would demand.

Use of lifter rods 32'' in place of lifter rod 32 may be desired for example, in situations where the bearing race that is to be pulled is not formed with sufficient depth to receive the offset portion of lifting end 46 of rod 32. Lifter rod 32'', formed with the centrally formed end 46'' without offset, has the advantage that it may be placed into operative condition by rotating rod 32'' 90° in either clockwise or counter-clockwise direction in contrast to rod 32 which must be rotated in only one direction once it has assumed a given position with respect to the bearing element that is to be pulled.

Lifter rods 32' with slots 33' parallel to flat surfaces 50' provide at least two advantages over other forms of such rods. One advantage of rod 32' is that it permits insertion of a screwdriver blade into slot 33' to facilitate rotation of rod 32' in the event that entry of spherical surface 48' into a bearing race is difficult due to comparative differences in size or misalignment of parts. A further advantage of the use of rods 32' resides in the fact that each slot 33' is formed so that it is parallel to flat surfaces 50' on opposite sides of spherical portions 48' of lifting end 46', so that such slots 33' offer tell-tale indication whether or not the spherical surfaces are positioned in lifting position. In this regard with bolt 30' centrally located with respect to the lifter rods 32' as seen in FIG. 7, it is clear that in the case of rod 32' in the upper right location of the arrangement slot 33' is not radially directed toward bolt 30' so that spherical surface 48' is not in its lifting position. On the other hand, slots 33' of lifter rods 32' in the lower location and in the upper left location of the arrangement in FIG. 7 are clearly radially directed toward bolt 30' at the center of the arrangement, so that at a glance of slots 33' one can readily ascertain that spherical surfaces 48' are in position in the bearing race to lift the latter.

It will be obvious to those skilled in the art that various changes may be made without departing from the scope of the invention and the invention is not to be considered limited to what is shown in the drawings and described in the specification.

What is claimed is:

1. Bearing extracting tool comprising a reaction housing adapted to be placed against machinery wall structure extending around bearing assembly and the end of a shaft or like member supported in the bearing assembly, the reaction housing having at least one open end which is to be placed against the machinery from which a bearing assembly is to be extracted, force receiving means at the free end of the reaction housing, and lifter means including portions extending through said force receiving means, said reaction housing and in a bearing assembly to be extracted, said lifter means including a force applying member having an end adapted to be applied against said force receiving means for applying a lifting force thereagainst, said force receiving means being in the form of a first rigid plate, said lifter means including a second rigid plate extending generally parallel to said first rigid plate, both of said rigid plates including a plurality of axially aligned perforations, said lifter means also including a plurality of lifter bars extending through aligned perforations in said first and second rigid plates.

said lifter bars extending through said perforations of said first rigid plate with adequate clearance for free movement therethrough, said lifter bars being provided with means for transmitting lifting force from said second rigid plate to said lifter bars, said lifter means also including an enlarged threaded bore and a force applying lifter bolt threadedly engaged in said bore, said bolt having a first end adapted to be applied against said first rigid plate to provide a lifting effect and a second end at which a turning effort may be applied, said lifter bars being threaded and provided with nuts threaded thereon and disposed on said second rigid plate to permit adjustment of the effective length of said bars and to transfer lifting force from said second rigid plate to each of said lifter bars, said lifter bars being provided with an enlarged end for insertion into a bearing assembly, said enlarged end having a generally spherical surface which is to be commensurate with the size of ball bearings of the bearing assembly to be removed, said enlarged end further having two generally parallel flat sides from which generally horizontal polar portions are omitted, and said lifter bars including means for facilitating rotation of said bars and at the same time indicating whether or not said lifter bars are in extracting position.

2. Tool as defined in claim 1 wherein said lifter bars include lifting portions each of which is formed as an enlarged end having a generally spherical surface which is to be commensurate with the size of ball bearings of the bearing assembly to be removed, said enlarged ends each having two generally parallel flat sides from which generally polar portions are omitted.

3. Tool as defined in claim 2 wherein said means facilitating rotation of said bars and at the same time indicating whether or not said lifter bars are in extracting position comprise a slot at the upper end of each of said lifter bars, said slot extending generally parallel to said two generally parallel flat sides.

4. Tool as defined in claim 3 wherein said reaction housing includes one or more access openings whereby adjustment of said lifter bars for insertion into a bearing assembly and adjustment thereof into lifting condition or adjustment of said lifter bars for insertion through perforations of said first rigid plate may be achieved.

5. Tool as defined in claim 4 wherein said first rigid plate is formed with a countersunk pilot portion upon which said first end of said bolt may be seated in force applying relationship.

6. Tool as defined in claim 5 wherein each of said enlarged ends extend from a lifter bar with the spherical surface offset from the center thereof.

7. Tool as defined in claim 5 wherein each of said enlarged ends extend from a lifter bar with spherical surface having its center along the centerline of the respective lifter bar from which the enlarged end extends.

* * * * *